United States Patent [19]

Ando

[11] Patent Number: 5,752,020

[45] Date of Patent: May 12, 1998

[54] STRUCTURED DOCUMENT RETRIEVAL SYSTEM

[75] Inventor: Toshiaki Ando, Kanagawa, Japan

[73] Assignee: Fuji Xerox Co., Ltd., Tokyo, Japan

[21] Appl. No.: 785,282

[22] Filed: Jan. 23, 1997

Related U.S. Application Data

[63] Continuation of Ser. No. 295,002, Aug. 24, 1994, abandoned.

[30] Foreign Application Priority Data

Aug. 25, 1993 [JP] Japan .................. 5-232455

[51] Int. Cl.$^6$ ........................... G06F 17/30
[52] U.S. Cl. ................ 395/604; 395/611; 395/612; 395/779; 395/774
[58] Field of Search .................. 395/604, 605, 395/611, 612, 779, 774

[56] References Cited

U.S. PATENT DOCUMENTS

| | | | |
|---|---|---|---|
| 5,418,946 | 5/1995 | Mori | 395/601 |
| 5,438,512 | 8/1995 | Mantha et al. | 395/779 |
| 5,600,771 | 2/1997 | Hayashi et al. | 395/774 |

OTHER PUBLICATIONS

Masahiro Morinaga et al., "A Multimedia Database Control Method Using SQL and ODA Attributes," Information Processing Society of Japan, 43rd National Conference (1991), 3–351.

"Information Processing—Text and Office Systems—Office Document Architecture (ODA) and Interchange Format," ISO 8613-2: 1989(E).

W.B. Croft, "A Framework for Office Document Retrieval," (1987), pp. 236–239.

*Primary Examiner*—Thomas G. Black
*Assistant Examiner*—Greta L. Robinson
*Attorney, Agent, or Firm*—Finnegan, Henderson, Farabow, Garrett & Dunner, L.L.P.

[57] ABSTRACT

A structured document retrieval apparatus which fetches an objective document from many documents stored in a storage device. In the apparatus, a logical structure extraction unit extracts the logical structure, document attribute, and content of a structured document, and the extracted information is stored in a document information storage unit. Since the information is stored only in this unit, it is not necessary to conduct cumbersome duplicate management such that the matching of information is always maintained. In the retrieval, a logical structure decision unit checks a document to decide whether it has the same logical structure as that written in a retrieval expression or not. Only in a document having the same logical structure, a component (for example, author) which is the ultimate retrieval object of the document is first accessed to be retrieved.

4 Claims, 10 Drawing Sheets

FIG.4

```
14
┌─────────────────────────────────────────────────────┐
│ PAPER                                               │
│   TITLE        "On Application of ○○ Technique to △△"│
│   AUTHOR       "Ichiro TANAKA"                      │
│   PREPARATION  "2.6.1993"                           │
│   DATE                                              │
│                                                     │
│   TEXT                                              │
│        CHAP.1  ┌──────────────────────────────────┐ │
│                │ TITLE "Recent Trends of          │ │
│                │        ○○ Technique"             │ │
│                │ PARA.1 ┌───────────────────────┐ │ │
│           15   │        │ (Content of PARA.1)   │ │ │
│                │        └───────────────────────┘ │ │
│                │ PARA.2 ┌───────────────────────┐ │ │
│                │        │ (Content of PARA.2)   │ │ │
│                │        └───────────────────────┘ │ │
│                └──────────────────────────────────┘ │
│                                                     │
│        CHAP.2  ┌──────────────────────────────────┐ │
│                │                                  │ │
│           16   │                                  │ │
│                │                                  │ │
│                └──────────────────────────────────┘ │
│                                                     │
│   BIBLIOGRAPHY                                      │
│        REFERENCE ┌────────────────────────────────┐ │
│                  │ TITLE  "How to Use             │ │
│                  │         ○○ Technique"          │ │
│                  │ AUTHOR "Eiichi SUZUKI"         │ │
│             17   │ SOURCE "Transactions of        │ │
│                  │         ×× Society"            │ │
│                  └────────────────────────────────┘ │
│                                                     │
│        REFERENCE ┌────────────────────────────────┐ │
│                  │                                │ │
│             18   │                                │ │
│                  └────────────────────────────────┘ │
└─────────────────────────────────────────────────────┘
```

| NAME OF RETRIEVAL EXPRESSION | REFERENCE RETRIEVAL (AUTHOR=Eiichi SUZUKI) |

```
SELECT
        SELECT
                SELECT    *
                FROM      REFERENCE
                WHERE     AUTHOR=
                          Eiichi SUZUKI
        FROM    BIBLIOGRAPHY
FROM    PAPER
```

FIG.10

| DOCUMENT IDENTIFIER | TITLE OF PAPER | AUTHOR | PREPARATION DATE | KEY WORD |
|---|---|---|---|---|
| 3276 | On Application of ○○ Technique to △△ | Ichiro TANAKA | 2.6.1993 | ○○ Technique |
| ----- | ----- | ----- | ----- | ----- |

On Application of ○○ Technique to △△

Ichiro TANAKA

Chapter1    Recent Trends of ○○ Technique

Paragraph1

(Content of Paragraph1) ---12

Paragraph2

(Content of Paragraph2) ---13

Chapter2

References (1) How to Use ○○ Technique, Eiichi SUZUKI,
    Transactions of ×× Society
(2) ---------------------, ---------------, ---------------

STRUCTURED DOCUMENT RETRIEVAL SYSTEM

This is a continuation of application Ser. No. 08/295,002 filed Aug. 24, 1994 now abandoned.

BACKGROUND OF THE INVENTION

1. Field of the Invention

The invention relates to a structured document retrieval apparatus which can fetch an objective document from many documents stored in a storage device.

2. Description of the Related Art

FIG. 9 is a diagram showing a conventional document retrieval apparatus. In FIG. 9, reference numeral 1 designates an input unit, 2 designates a display unit, 3 designates a retrieval unit, 4 designates a document attribute management unit, 5 designates a document storage unit, and 6 designates a registration unit. In practice, these units are realized by a computer. The input unit 1 is a keyboard or a mouse, and the display unit 2 is a display device. The document attribute management unit 4, and the document storage unit 5 are constituted by a storage device. The retrieval unit 3 is realized by software for conducting a retrieval operation. The registration unit 6 is realized by another software for conducting an operation of registering a document.

When a document is to be registered, the document is transferred from the input unit 1 to the registration unit 6. Prior to the description of the operation of the registration unit 6, a document, document attributes, and a document identifier will be described. FIG. 11 is a diagram illustrating a document. This document is a paper entitled "On Application of ○○ Technique to △△" and prepared by Mr. Ichiro TANAKA on Feb. 6, 1993. The first chapter is entitled "Recent Trends of ○○ Technique", and has first and second paragraphs which include contents 12 and 13, respectively. The paper further has a second chapter and several references written at the end of the paper. Such a paper or a report constitutes a document.

Information indicative of features of the paper, such as a title, author, date of preparation, and key words is called document attributes. Conventionally, when documents are accumulated as retrieval objects, each document is given such document attributes. The document identifier is a means for, when a document is stored in a storage device, distinguishing the document from other documents and identifying it. Examples of document identifiers, include "serial number", a "file name" or the like of the stored document.

Referring again to FIG. 9, the operation of registering a document will be described. The outline of the sequence of the registration operation is indicated by solid-line arrows and broken-line arrows which are drawn in relation to the registration unit 6. When a document is transferred to the registration unit 6, the unit 6 first extracts the document attributes given to the document, and stores the extracted document attributes in the document attribute management unit 4. The registration unit 6 further extracts the content of the document, such as a document attribute, using a special rule and stores the extracted content in the document attribute management unit 4. However, document attributes which are to be stored are determined at the time when the document retrieval apparatus is constructed. The document itself is stored in the document storage unit 5 which is configured by, for example, a magnetic disk drive. When the document is stored, the document identifier is defined. The registration unit 6 sends the defined document identifier to the document attribute management unit 4 in which the document identifier is stored together with the document attributes.

FIG. 10 is a diagram illustrating the document attribute management unit. With respect to the document of FIG. 11, a serial number "3276" is used as the document identifier, and various document attributes are recorded. For example, "On Application of ○○ Technique to △△" is recorded as the title of the paper, "Ichiro TANAKA" as the author, "Feb. 6, 1993" as the preparation date, and "○○ Technique" as the key word. The registration of a document which is a retrieval object is conducted as described above. As a result, the document attributes are accumulated in the document attribute management unit 4, and the document itself is stored in the document storage unit 5.

Next, the operation of retrieving a document which has been stored in the above manner will be described. The outline of the sequence of the retrieval operation is indicated by solid-line arrows and broken-line arrows which elongate from the input unit 1 to the display unit 2 through the retrieval unit 3. At first, a retrieval expression for retrieving the document is input through the input unit 1, and then transferred to the retrieval unit 3. The retrieval expression is an expression which is structured so that the document is retrieved by using the document attributes as clues. In accordance with the retrieval expression, the retrieval operation is conducted on the document attribute management unit 4. If there exist document attributes satisfying the retrieval expression, the document identifier corresponding to the document attributes is obtained (this operation is indicated by the arrow directed from the document attribute management unit 4 to the retrieval unit 3). In the case of FIG. 10, when a document is to be retrieved in which the author is "Ichiro TANAKA", for example, the document identifier "3276" is obtained as a result of the retrieval.

Once the document identifier is known, the whole document (the document 11 of FIG. 11) corresponding to the document identifier can be fetched from the document storage unit 5 by using the document identifier as a clue. A necessary portion (for example, a bibliography) of the fetched document is sent to the display unit 2 to be displayed thereon. The arrow elongating in the route of the document storage unit 5→the retrieval unit 3→the display unit 2 indicates the path of fetching and displaying the document.

However, the above-described conventional document retrieval apparatus has the following problems.

A first problem is that information on a document must be managed in a duplicate manner, and therefore, the management is cumbersome and a large storage area is required.

A second problem is that the document storage unit 5 stores the whole of each document in the unit, and therefore, a retrieval result is obtained in the unit of a document and a process of navigating (or tracing) the logical structure of the document cannot be conducted rapidly.

The first problem will be described. In the conventional document retrieval apparatus of FIG. 9, information on documents is managed in a duplicate manner, or by the document attribute management unit 4 and the document storage unit 5. When documents are to be updated, therefore, the updating operation must be conducted while maintaining the match between the two units, thereby making the management cumbersome. Furthermore, information (for example, titles) stored in the document attribute management unit 4 is naturally also included in documents stored in the document storage unit 5, with the result that the same information is stored in duplicate. This requires a large storage area.

Then the second problem will be described. When a document is to be retrieved, a process (navigation) of tracing the logical structure of a document is often required. In such a case, components constituting the logical structure of a document (elements forming the framework of a document, such as the author (such elements will be described with reference to FIG. 5)) must be referred to one by one from the start. When a paper is actually retrieved and a bibliography of the paper is to be displayed on the display unit 2, for example, a document is fetched by a retrieval, and components of the fetched document are sequentially checked starting from the first component to see whether it is a bibliography or not. The result is that the check operation reaches the bibliography last. Since the bibliography cannot be accessed first and many other components existing before the bibliography must be checked in advance, it is impossible to rapidly conduct the process. Since a large amount of data, or more specifically the whole of document must be handled, it is impossible to conduct an operation in which the data are once stored in a cache memory and then processed. In other words, the caching cannot increase the speed of the process.

SUMMARY OF THE INVENTION

It is an object of the invention to solve the above-discussed problems and provide a structured document retrieval apparatus in which it is not necessary to manage the same information in a duplicate manner and the retrieval can be conducted in a short period.

In order to attain the above object, the invention provides a structured document retrieval apparatus in which structured documents are stored and a retrieval is conducted on the stored structured documents in accordance with a retrieval expression, including: a registration unit for conducting a preprocess for storing a structured document received from an input unit; a logical structure extraction unit in which knowledge of logical structures of documents is incorporated, and which extracts a logical structure, a document attribute, a document content from the input structured document; a document information storage unit which stores the extracted logical structure, document attribute, document content while grouping them by kind; a logical structure decision unit in which knowledge of logical structures of documents is incorporated, and which decides whether a logical structure read out from the document information storage unit coincides with a logical structure written in the retrieval expression or not; and a retrieval unit which conducts a retrieval by reading out only information which is an ultimate retrieval object of a document which is decided that the logical structure coincides with that of the retrieval expression, from the document information storage unit, and which rearranges a structured document obtained as a result of the retrieval, and outputs the document.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 4 is a diagram illustrating the concept of a structured document;

FIG. 10 is a diagram illustrating a document attribute management unit; and

FIG. 11 is a diagram illustrating a document.

DETAILED DESCRIPTION OF THE PREFERRED EMBODIMENTS

Figure 1:
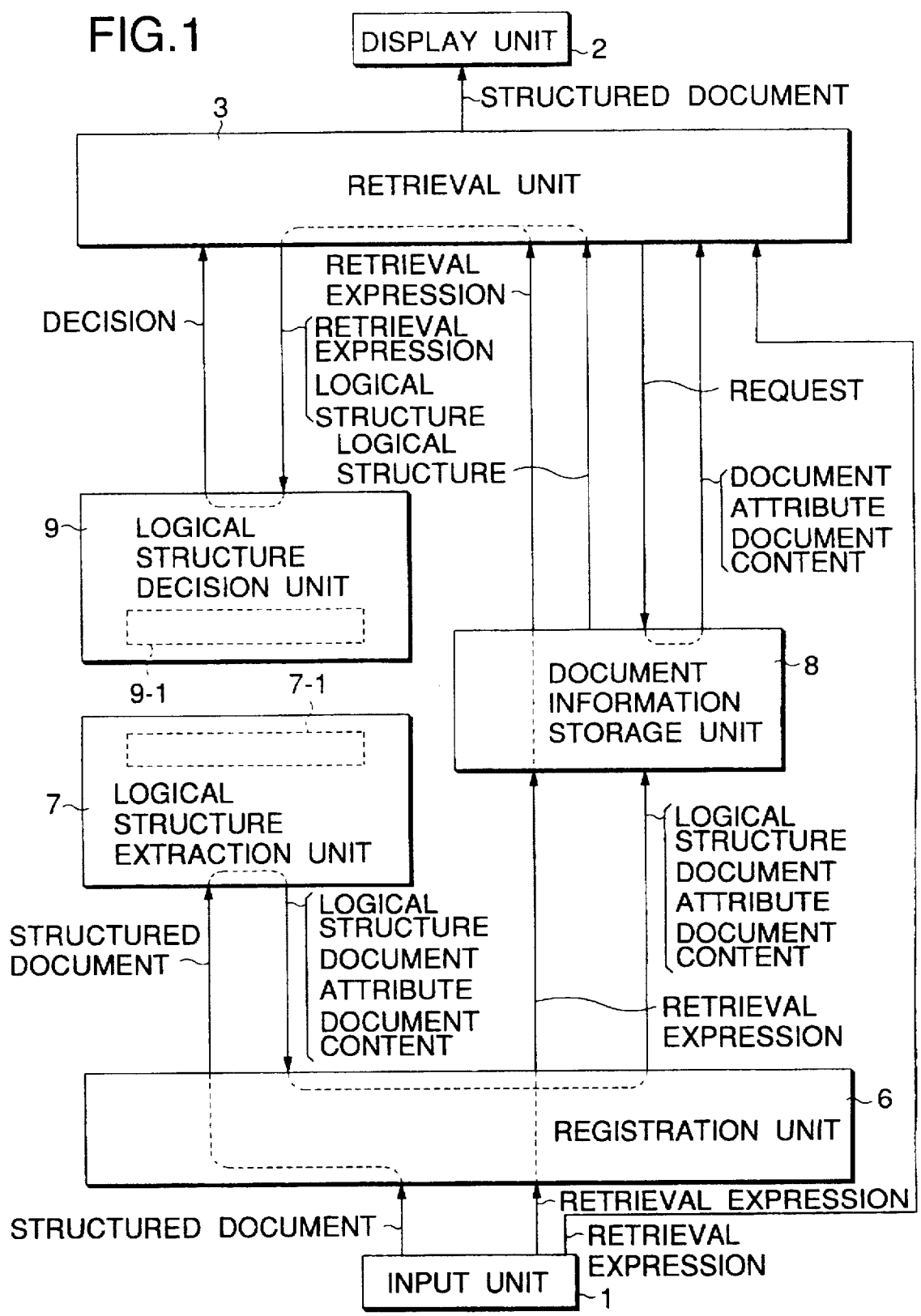
FIG. 1 is a diagram showing a structured document retrieval apparatus according to a first embodiment of the invention.

Hereinafter, an embodiment of the invention will be described in detail with reference to the drawings. FIG. 1 is a diagram showing a structured document retrieval apparatus according to a first embodiment of the invention. The reference numerals correspond to those of FIG. 9. Reference numeral 7 designates a logical structure extraction unit, 7-1 designates a logical structure knowledge base, 8 designates a document information storage unit, 9 designates a logical structure decision unit, and 9-1 designates a logical structure knowledge base. In the invention, a document which is input through the input unit 1 is not an ordinary one but a "structured document". A structured document will be described later with reference to FIG. 4.

The logical structure extraction unit 7 extracts document information such as "logical structure", "document attribute", and "document content" from a structured document, and is realized by software or hardware. The "logical structure", and the "document content" will be described later. When such information is to be extracted, a database of knowledge of the logical structure (for example, the rule of the logical structure, and the data formats of the components of a document) is required. Therefore, the logical structure knowledge base 7-1 is incorporated in the logical structure extraction unit 7.

The document information storage unit 8 stores document information extracted by the logical structure extraction unit 7, and is configured by a storage device. In the invention, document information is stored only in this unit, and not stored in another unit in a duplicating manner. Retrieval expressions which are frequently used may previously be prepared and stored in the document information storage unit 8.

The retrieval unit 3 receives a retrieval expression, and then causes the logical structure decision unit 9 to decide which one of the logical structures of the structured documents stored in the document information storage unit 8 coincides with the logical structure written in the retrieval expression. Then, the retrieval unit 3 obtains information on the structured document having the logical structure which coincides with that of the retrieval expression, from the document information storage unit 8, and conducts a retrieval operation on the information. A result of the retrieval operation is displayed on the display unit 2.

The retrieval unit 3 is realized by software, and the logical structure decision unit 9 is realized by software or hardware. In the decision of a logical structure, a database of knowledge of the logical structure is required, and therefore the logical structure knowledge base 9-1 is incorporated in the logical structure decision unit 9.

Figures 5, 6:
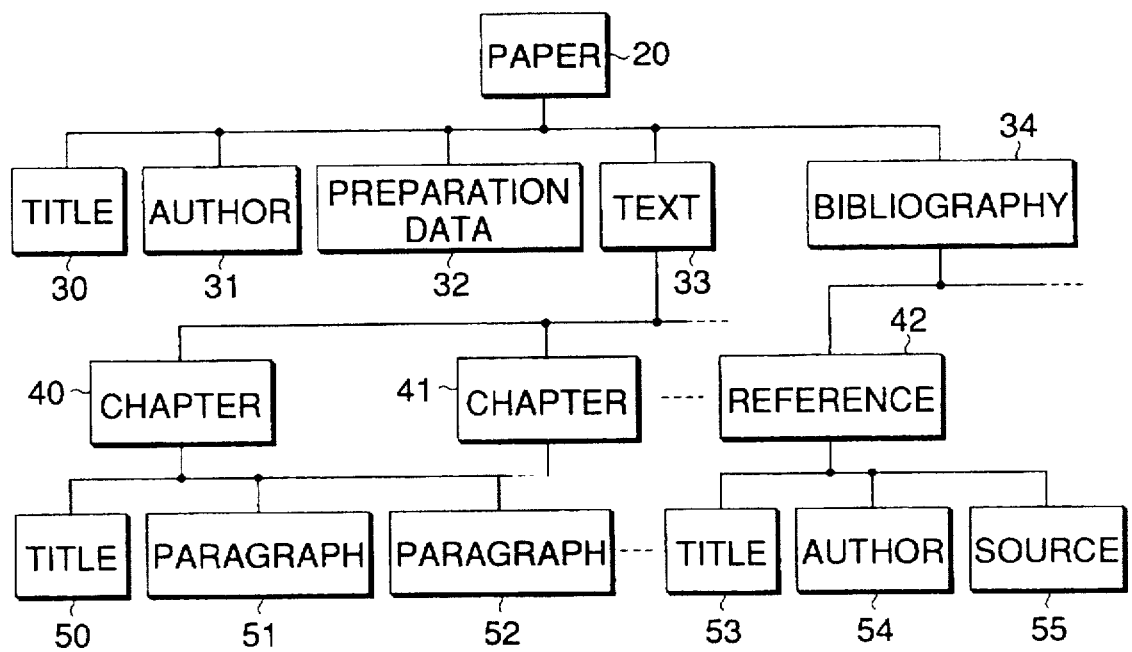
FIG. 5 is a diagram showing an example of a logical structure.
FIG. 6 is a diagram showing an example of a retrieval expression.

FIG. 4 is a diagram illustrating the concept of a structured document. It should be noted that the illustrated document is not a document on sheets such as shown in FIG. 11, but the content of the document of FIG. 11 is used as an example. Reference numeral 15 designates the content of the first chapter, 16 designates the content of the second chapter, and 17 and 18 designate the contents of the references, respectively. The document has a structure consisting of various components. Each of the components is provided with information indicative of the structure of the component. Such a document is called a "structured document". For example, FIG. 5 shows only a logical structure.

In the structured document of FIG. 4, for example, the words "On Application of ○○ Technique to △△" constitute the structure of the title of the paper. In order to indicate that the words constitute the structure of the title of the paper, a term "TITLE" is placed at the head as follows:

[TITLE "On Application of ○○ Technique to △△"].

The "TITLE" placed at the head is the name of the component constituting the structure. The portion enclosed in double quotation marks "" indicates the content of the document, and functions as information which appears on a sheet as shown in FIG. 11. Also, in words:

[AUTHOR "Ichiro TANAKA"].

"AUTHOR" at the head is the name of the component. In the example of FIG. 4, specific letter groups such as "TITLE", and "AUTHOR" are used. In place of such specific letter groups, specific codes or symbols may be used. Knowledge of such codes or symbols is previously stored in the logical structure knowledge bases 7-1 and 9-1.

A logical structure means a logical relationship between components constituting a document. FIG. 5 is a diagram showing the logical structure of the structured document 14 of FIG. 4. Since the components of the structured document 14 constitute the "paper" as a whole, it is the "paper" that corresponds to the root of the logical relationship (logical root of the document). The "paper" 20 of the structured document 14 consists of "TITLE (of the paper)" 30, "AUTHOR" 31, "PREPARATION DATE" 32, "TEXT" 33, and "BIBLIOGRAPHY" 34. The "TEXT" 33 consists of several "CHAPTERs" 40 and 41, and each "CHAPTER" consists of "TITLE (of the chapter)" 50, and several "PARA-GRAPHs" 51 and 52. The "BIBLIOGRAPHY" consists of several "REFERENCEs" 42, and each "REFERENCE" consists of "TITLE (of the reference)" 53, "AUTHOR" 54, and "SOURCE" 55. In other words, a logical structure inevitably exists in a structured document.

Figure 3:
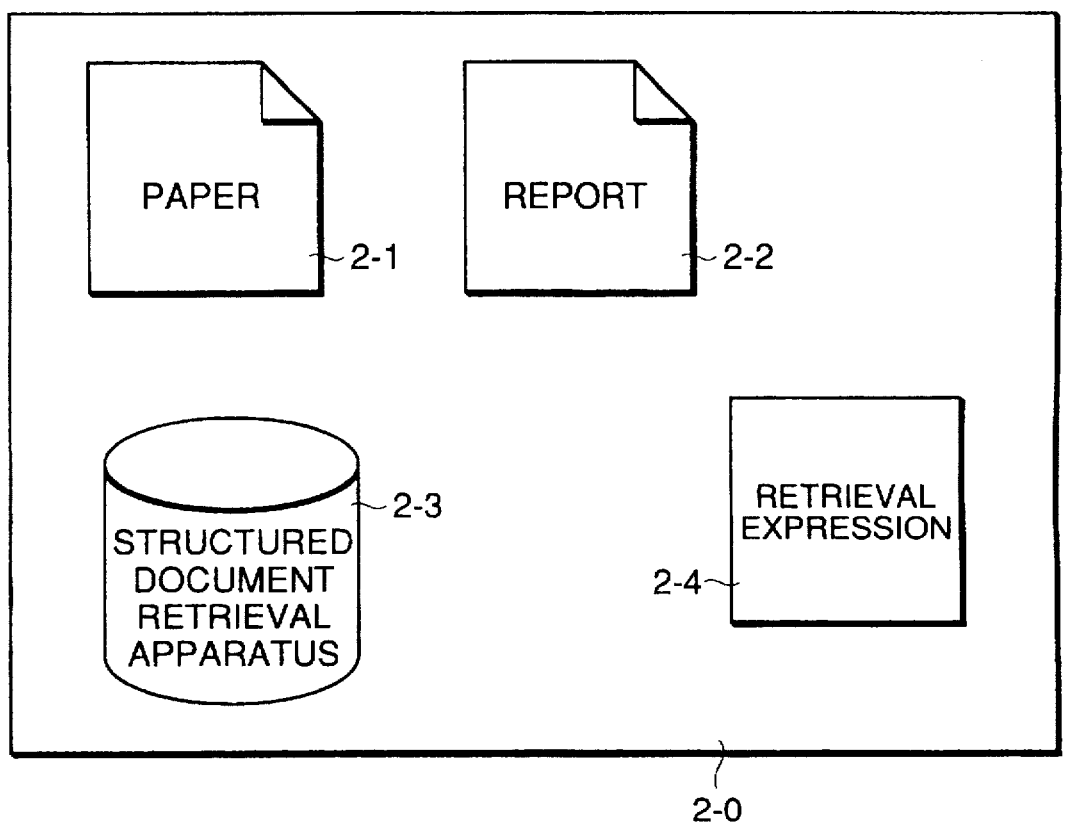
FIG. 3 is a diagram showing a window of a display unit.

Referring again to FIG. 1, the registration operation will be described. At first, a structured document is transferred from the input unit 1 to the registration unit 6. Specifically, the transfer is started by overlaying a paper icon 2-1 or a report icon 2-2 displayed in a window 2-0 of the display unit 2 as shown in FIG. 3, on a structured document retrieval apparatus icon 2-3. When the structured document is transferred to the registration unit 6, the logical structure extraction unit 7 processes the structured document so that the logical structure, the document attribute, and the document content are extracted from the structured document.

When the component "AUTHOR" is to be extracted, for example, the structure information "AUTHOR" added to the structured document is used as a clue, and "Ichiro TANAKA" is extracted as the document content.

A document content includes text information, sizes of characters, fonts, etc. in the components (for example, the first paragraph of the second chapter).

Figure 7:
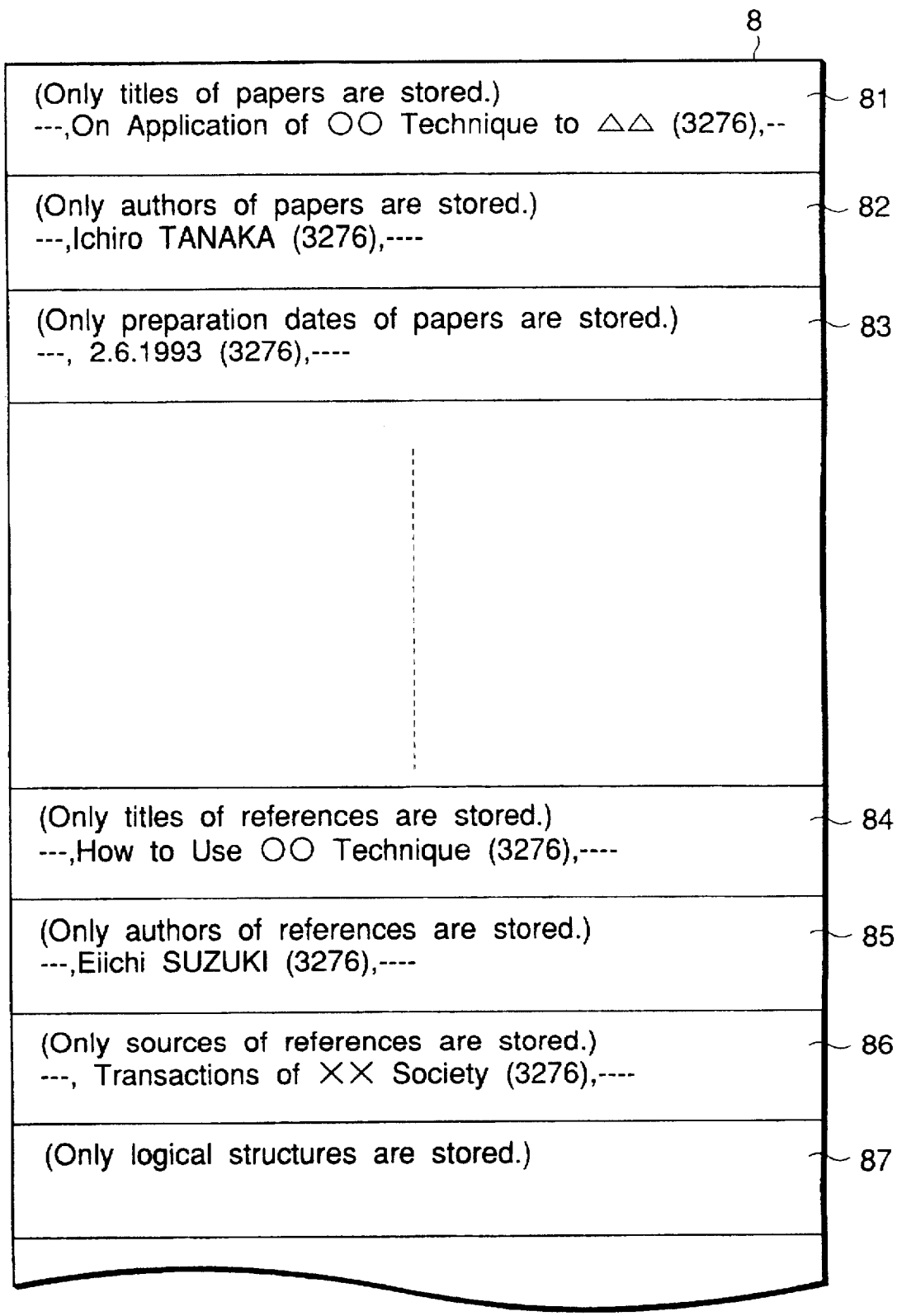
FIG. 7 is a diagram illustrating a document information storage unit.

The extracted "logical structure", "document attribute", and "document content" are stored in the document information storage unit 8. FIG. 7 is a diagram illustrating the document information storage unit 8. In the document information storage unit 8, document contents belonging to components of the same name and the same kind are collectively stored in one area. In FIG. 5, for example, authors (of papers) are collectively stored in a paper author storage unit 82. This collective storage allows documents having the same logical structure and the same components to be rapidly retrieved.

Authors of references are stored in a reference author storage unit 85 which is another area. Therefore, an author "Eiichi SUZUKI" of a reference is stored in this area. Similarly, a paper title storage unit 81 stores only titles of papers, and a paper preparation date storage unit 83 stores only preparation dates of papers. Further, a reference title storage unit 84 stores only titles of references, a reference source storage unit 86 stores only sources of references, and a logical structure storage unit 87 stores only logical structures. Therefore, an input structured document is stored in a separate manner in the unit of the components. The logical structure is provided with link information relating to the document content of the respective component. Similarly, a document identifier may be added in order to identify the logical structure belonging to the component.

In the registration unit 6, retrieval expressions which are frequently used may be previously prepared and registered in addition to structured documents such as those described above. A retrieval expression input for purpose of registration is stored in an area of the document information storage unit 8 which is dedicated for registration of retrieval expressions.

The retrieval operation is started upon the transfer of a retrieval expression to the retrieval unit 3. When a retrieval expression which is previously registered in the registration unit 6 is to be used, the retrieval expression is designated and then transferred to the retrieval unit 3. Specifically, a retrieval expression icon 2-4 which is displayed in the window of the display unit 2 as shown in FIG. 3 is clicked by a mouse so that registered retrieval expressions are displayed, and one of the displayed expressions is clicked to designate it. When a retrieval expression which is not previously registered is to be used, the retrieval expression is newly prepared, and then input through the input unit 1 so as to be transferred to the retrieval unit 3. In FIG. 1, this case is indicated by the solid-line arrow which is directly connected from the input unit 1 to the retrieval unit 3.

FIG. 6 is a diagram showing an example of a retrieval expression. First, the meaning of the retrieval expression will be described, and thereafter a retrieval using the retrieval expression will be described. The retrieval expression is named "REFERENCE RETRIEVAL (AUTHOR= Eiichi SUZUKI)". In the retrieval expression, the vertical column which is in the most right portion,

```
SELECT *
FROM    REFERENCE
WHERE   AUTHOR=Eiichi SUZUKI
``` means that a reference is referred to, and, when the author is "Eiichi SUZUKI", all data of the reference are extracted. The data items of a reference include "TITLE", "AUTHOR", and "SOURCE". Therefore, the above-mentioned portion means that data of all of these items are to be extracted. The symbol "*" has a meaning of "all". When the structured document 14 of FIG. 4 is retrieved, for example, the following data are displayed on the display unit 2:

"How to Use ○○ Technique, Eiichi SUZUKI, Transactions of xx Society"

The portion of the retrieval expression other than the above-mentioned portion, i.e., the portion which is in the left side of the center vertical column in FIG. 6:

```
SELECT
    SELECT
        FROM BIBLIOGRAPHY
FROM PAPER
``` indicates a logical structure for searching "AUTHOR (of a reference)" which is the ultimate retrieval object. In other words, the portion has a meaning of "in a bibliography in a paper". Consequently, the meaning (object) of the retrieval expression is that a reference in which the author is Eiichi SUZUKI is searched from "BIBLIOGRAPHY" of various "PAPERs" and a list of all data (including a source, etc.) of the reference is made.

As described above, a retrieval expression using a logical structure enables the author of a paper and the author of a reference to be clearly distinguished from each other.

Figure 2:
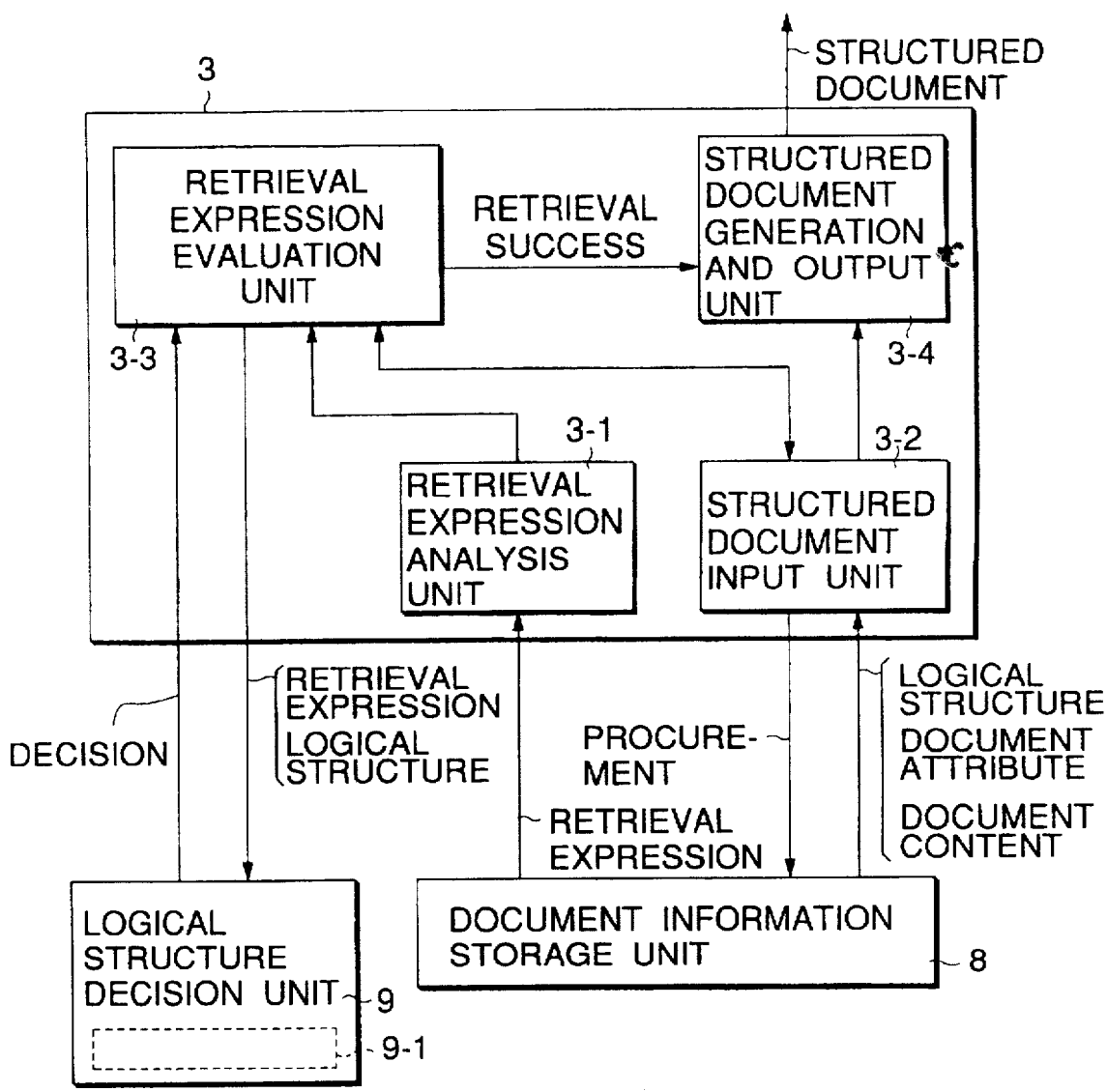
FIG. 2 is a diagram showing the function of a retrieval unit.

Next, the retrieval operation of the above-mentioned retrieval expression will be described. FIG. 2 is a diagram showing the function of the retrieval unit 3. The retrieval operation is conducted in the following four steps:

(1) checking the retrieval expression;

(2) collating the logical structure;

(3) retrieving in the ultimate retrieval object; and (4) outputting retrieved data.

Hereinafter, these steps will be sequentially described.

(1) Checking the retrieval expression

When the retrieval unit 3 receives the retrieval expression, a retrieval expression analysis unit 3-1 checks the retrieval expression to see whether the retrieval expression matches the rule of the logical structure or not. This is conducted because, when the expression fails to match the rule, it is impossible to perform the retrieval. Alternatively, when the retrieval expression is to be registered, the retrieval expression may previously be checked to see whether it matches the rule of the logical structure or not. In this alternative, the retrieval expression analysis unit 3-1 is not required.

(2) Collating the logical structure

The retrieval expression is then sent to a retrieval expression evaluation unit 3-3, and the retrieval written in the retrieval expression is executed. First, the retrieval using the logical structure as a clue is conducted. Specifically, a document having a logical structure indicated in the retrieval expression of FIG. 6 or of "PAPER"→"BIBLIOGRAPHY"→"REFERENCE"→"AUTHOR (of the reference)" is searched. In the search, the retrieval expression evaluation unit 3-3 obtains logical structures of documents from the logical structure storage unit 87 (see FIG. 7) of the document information storage unit 8, through a structured document input unit 3-2, and then sends the logical structures together with the retrieval expression to the logical structure decision unit 9, so that the decision is conducted to see whether the logical structures coincide with that of the retrieval expression or not. The decision is conducted with reference to the logical structure knowledge base 9-1. Then, the document identifiers (for example, 3276) of documents having a logical structure which coincides with that of the retrieval expression are stored, and the link information added to the corresponding author is stored. As compared with information amount of the contents of the documents, the data amount of the logical structures is small, and therefore the retrieval can be conducted in a short period.

(3) Retrieving in the ultimate retrieval object

Next, the retrieval expression evaluation unit 3-3 obtains the component which is the ultimate retrieval object of the retrieval expression, and conducts the collating. In the retrieval expression of FIG. 6, the component which is the ultimate retrieval object is "AUTHOR (of the reference)". On the basis of the link information and the document identifier, therefore, data of authors of documents having a logical structure which coincides with that of the retrieval expression are sequentially obtained from the reference author storage unit 85 of the document information storage unit 8, through the structured document input unit 3-2. The data of authors are checked to see whether the data coincide with "Eiichi SUZUKI" of the retrieval expression. Only the document identifier of a document in which the coincidence is attained is stored. If the coincident "AUTHOR" is stored at this time, it is not required to fetch "AUTHOR" in step (4).

(4) Outputting retrieved data

When the retrieval succeeds, the document identifier (for example, 3276) of the retrieved document is sent to a structured document generation and output unit 3-4 which in turn obtains data to be displayed (in the example of FIG. 6, all data of the reference, i.e., the title, author, and source) requested in the retrieval expression, from the document information storage unit 8. On the basis of information on the logical structure, the structured document generation and output unit 3-4 rearranges the data into a form which is identical with the description of the structured document, and then outputs the data to the display unit 2.

Figure 8:
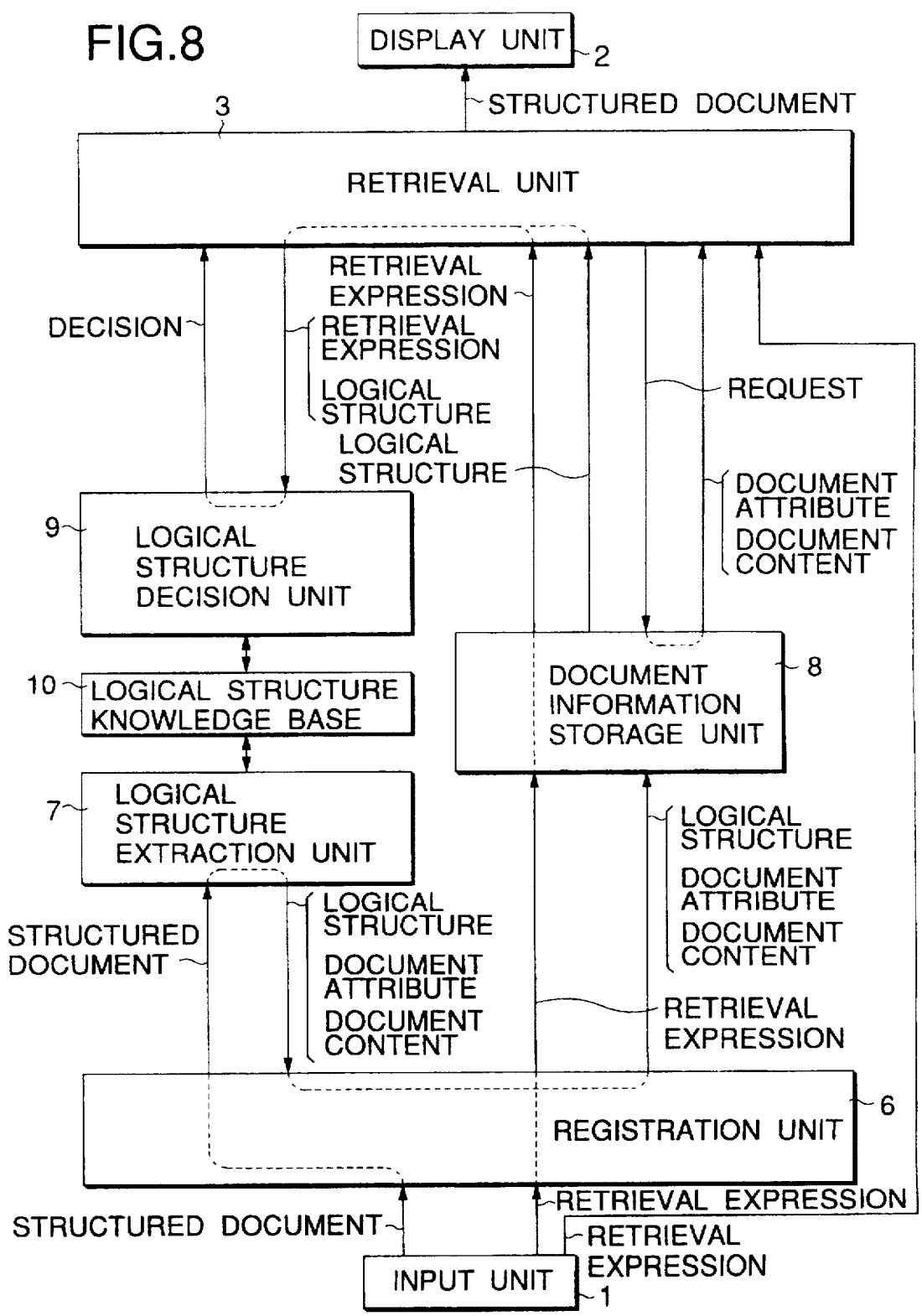
FIG. 8 is a diagram showing a second embodiment of the invention.

FIG. 8 is a diagram showing a second embodiment of the invention. The reference numerals correspond to those of FIG. 1, and 10 designates a logical structure knowledge base. The second embodiment is different from the first embodiment of FIG. 1 in that the logical structure knowledge base which, in the first embodiment, is incorporated in each of the logical structure decision unit 9 and the logical structure extraction unit 7, is independently formed or is stored in the logical structure knowledge base 10 so as to be used in common with the two units.

In the logical structure knowledge base, knowledge of the logical structure such as the rule of the logical structure, and the data formats of the components are held. In the first embodiment, such knowledge is incorporated in programs for handling the logical structure of the logical structure extraction unit 7 and the logical structure decision unit 9. When the data format of the components is changed, therefore, also the programs must be amended. To the contrary, in the second embodiment, the knowledge is independent from the programs, and hence the change of the data format can be coped only with the change of the contents of the logical structure knowledge base 10 and does not require the correction of the programs. Since one database is used in common, it is not required to have the same knowledge in a duplicate manner. Furthermore, knowledge of a new document can easily be added.

As described above, the structured document retrieval apparatus of the invention can attain the following effects.

(1) It is not required to manage the same information in a duplicate manner.

Figure 9:
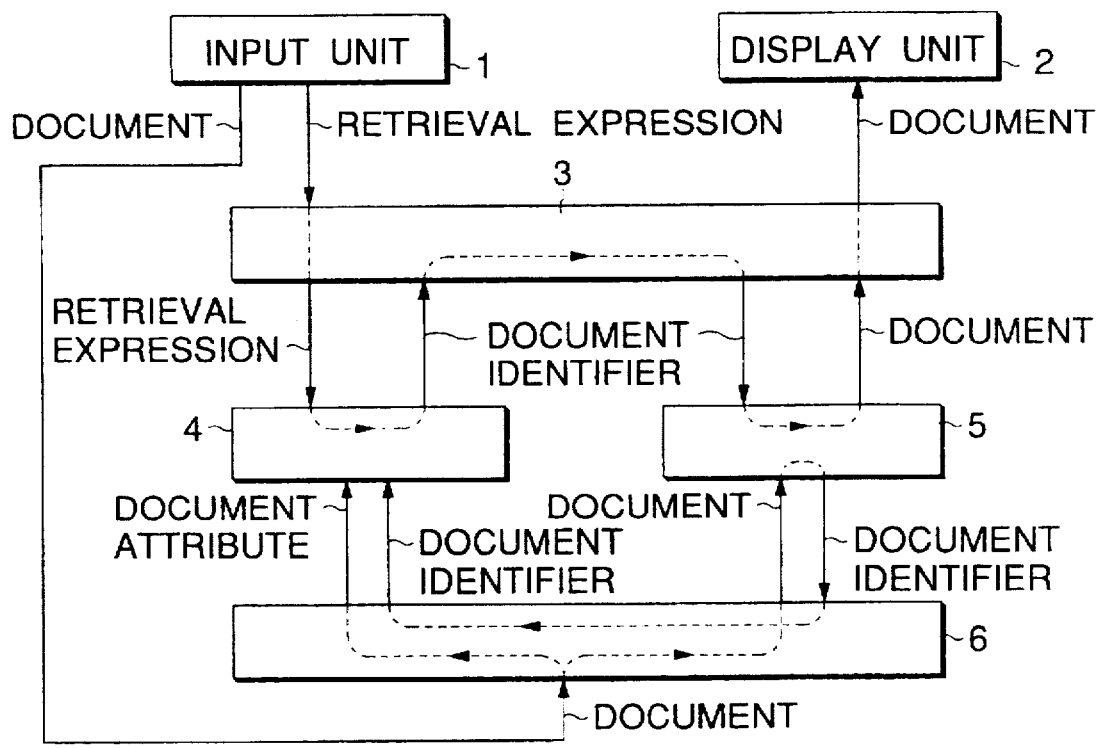
FIG. 9 is a diagram showing a conventional document retrieval apparatus.

Conventionally, information stored in the document attribute management unit 4 of FIG. 9 is stored also in the document storage unit 5. In the invention, such information is stored only in the document information storage unit 8. Therefore, it is not necessary to conduct cumbersome duplicate management such that the matching of information is always maintained. Moreover, the size of the storage area can be reduced.

(2) The retrieval can be conducted in a short period.

In the invention, the retrieval is conducted as follows: The logical structure is extracted to be stored, and a document having the same logical structure as that written in a retrieval expression is searched. Thereafter, the access operation is first conducted on the component which is the ultimate retrieval object of the document. Consequently, the working amount is reduced, and the retrieval time is shortened as compared with a conventional retrieval apparatus in which the retrieval is started from the top of a document and continues until reaching the component that is the ultimate retrieval object.

(3) As a secondary effect, it is possible to eliminate the labor of previously deciding and providing the document attribute in order to directly retrieve the content of a document.

What is claimed is:

1. A structured document retrieval apparatus for storing structured documents and for retrieving the stored documents in accordance with a retrieval expression, each of said structured documents comprising a plurality of components and logical structures therebetween that define a hierarchical relationship between components, said apparatus comprising:

a registration unit for conducting a preprocess for storing a structured document received from an input unit;

a logical structure extraction unit for incorporating knowledge of the logical structures of the structured documents, and for extracting a select logical structure, a document attribute, and a document content from the structured documents in accordance with the knowledge of the logical structures;

a document information storage unit for storing the extracted logical structure, document attribute, and document content while grouping them by kind;

a logical structure decision unit for incorporating knowledge of logical structures of the structured documents, and for deciding whether or not a logical structure read out from said document information storage unit coincides with a logical structure written in the retrieval expression; and a retrieval unit for conducting a retrieval by reading out from said document information storage unit only information which is an ultimate retrieval object of a structured document in which the logical structure coincides with that of the retrieval expression, for rearranging a structured document obtained from the retrieval, and for outputting the rearranged structured document.

2. A structured document retrieval apparatus as recited in claim 1, further comprising:

an independently disposed logical structure knowledge base for storing the knowledge of logical structures of the structured documents, wherein said logical structure extraction unit and said logical structure decision unit commonly use said logical structure knowledge base.

3. A structured document retrieval apparatus comprising:

a document input unit for inputting a structured document, said structured document comprising a plurality of components and logical structures therebetween that define a hierarchical relationship between components;

a logical structure and document content extraction unit for extracting a logical structure and a document content from the structured document received from said document input unit;

a document information storage unit for storing the logical structure and the document content extracted by said logical structure and document content extraction unit, while adding an identifier to the logical structure and the document content;

a retrieval expression input unit for inputting a retrieval expression having retrieval conditions based on a logical structure and a document content; and a retrieval unit for conducting a retrieval by reading out from said document information storage unit only information which is an ultimate retrieval object of a structured document in which the logical structure coincides with that of the retrieval expression wherein said retrieval unit comprises:

a logical structure decision unit for retrieving logical structure from said document information storage unit which coincides with the logical structure conditions of the retrieval expression, a fetch unit for fetching from said document information storage unit a document content corresponding to an identifier of a retrieval result of the logical structure decision unit, an evaluation unit for retrieving and evaluating the fetched document content based on document content conditions of the retrieval expression, and an output unit for combining the document content obtained as a retrieval and evaluation result from the evaluation unit with a logical structure corresponding to an identifier of the document content, and for outputting the combination.

4. A structured document retrieval apparatus as recited in claim 1, wherein said document information storage unit collectively stores in one area document contents belonging to document components which are included in the structured document and are of the same kind.

* * * * *

UNITED STATES PATENT AND TRADEMARK OFFICE
CERTIFICATE OF CORRECTION

PATENT NO. : 5,752,020
DATED : May 12, 1998
INVENTOR(S) : Toshiaki ANDO

It is certified that error appears in the above-identified patent and that said Letters Patent is hereby corrected as shown below:

Title Page, item [54], and col.1, line 2, in the title, line 2, "SYSTEM" should read --APPARATUS WITH A LOGICAL STRUCTURE EXTRACTION UNIT FOR OUTPUTTING AND REARRANGING DOCUMENTS--.

Claim 1, column 9, line 18, after "stored", insert --structured--.

Claim 3, column 10, line 31, after "retrieving", insert --a--.

Signed and Sealed this

Eighteenth Day of May, 1999

*Attest:*

*Attesting Officer*

Q. TODD DICKINSON

*Acting Commissioner of Patents and Trademarks*